May 27, 1924.
S. RATH
1,495,714
SELF ADJUSTING BEARING LOCK
Filed June 27, 1921
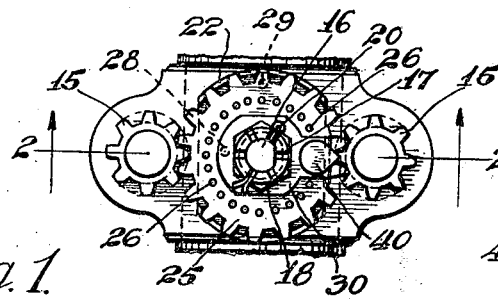
Fig. 1.
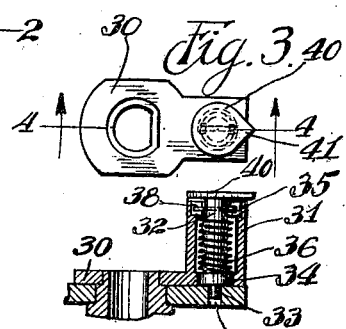
Fig. 3.
Fig. 4.
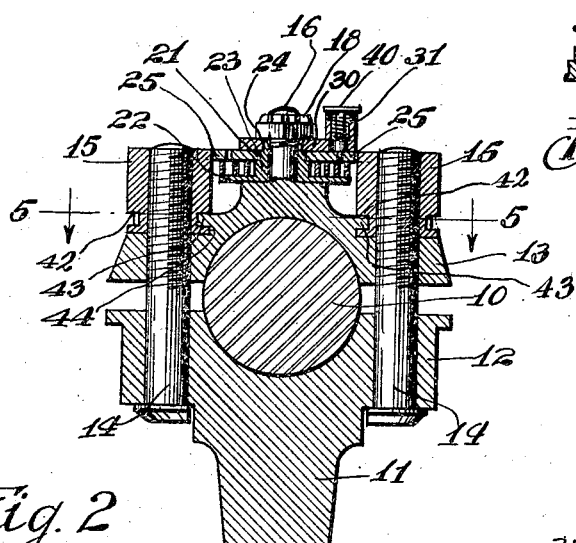
Fig. 2.
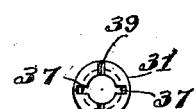
Fig. 6.
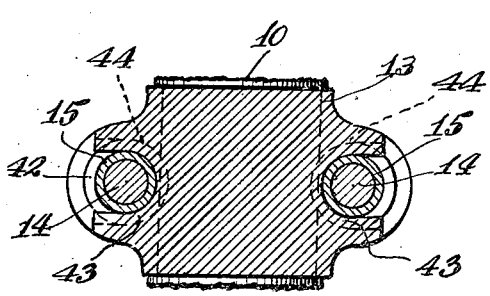
Fig. 5.
INVENTOR.
STEPHAN RATH.
BY
Carl Strover
ATTORNEY.

Patented May 27, 1924.

1,495,714

UNITED STATES PATENT OFFICE.

STEPHAN RATH, OF CHICAGO, ILLINOIS, ASSIGNOR OF ONE-HALF TO AUGUST W. HORNIG, OF CHICAGO, ILLINOIS.

SELF-ADJUSTING BEARING LOCK.

Application filed June 27, 1921. Serial No. 480,882.

*To all whom it may concern:*

Be it known that I, STEPHAN RATH, a native of Germany, who has declared his intention to become a citizen of the United States, residing in the city of Chicago, county of Cook, and State of Illinois, have invented certain new and useful Improvements in Self-Adjusting Bearing Locks, of which the following is a specification.

The primary object of my invention is to improve the bearing-lock described in my application for United States Patent, Serial #441797, by providing the same with a releasable lock by which further tightening of the bearing may be prevented after a smooth fit has been attained, until further wear shall make additional tightening desirable.

In the drawings Fig. 1 is a top plan-view of a crank-shaft with a connectingrod-bearing applied thereto and locked by my device; Fig. 2 is a sectional elevation of the crank shaft and connectingrod-bearing and other parts applied thereto, in the plane indicated by line 2—2 in Fig. 1; Fig. 3 is an enlarged top-plan-view of some of the parts shown in Figs. 1 and 2; Fig. 4 is a sectional elevation of the parts shown in Fig. 3 in the plane indicated by line 4—4 in Fig. 3; Fig. 5 is a sectional view, at right angles to the view shown in Fig. 2, in the plane indicated by line 5—5 in Fig. 2; and Fig. 6 is a top plan view of the tubular boss shown in Fig. 4.

Referring to the drawings, on crank-shaft 10 there is mounted connecting rod 11 by means of lower bearing 12, upper bearing 13, bearing bolts 14 and bearing-bolt nuts 15. Bearing 13 is preferably machined so as to form at its upper end a pin 16 having a flattened side 17, and has threaded on to it a nut 18 provided with slots 19 for the reception of cotterpin 20. Between the body of bearing 13 and nut 18 there is non-rotatably mounted, on pin 16, with a snug sliding fit, a sleeve 21 having a horizontal flange 22 extending therefrom at its lower end. This sleeve is formed at its upper end with two successively reduced portions 23 and 24; portion 23 being round while portion 24 is flattened on one side. On portion 23 there is rotatably mounted a gear 25, adapted to engage nuts 15, and provided on its upper surface with a series of cylindrical vertical holes 26. Between flange 22 and gear 25 a coil spring 27 is mounted the inner end of which is preferably attached to a pin 28, inserted in flange 22 near sleeve 21, while its outer end is preferably attached to a pin 29, inserted in gear 25 near the outer edge thereof. On portion 24 of sleeve 21 there is nonrotatably mounted a plate 30 which carries at its outer end a tubular boss 31. Within this boss there is mounted a vertical pin 32 the lower reduced end 33 of which projects through a disk 34, suitably fastened on such reduced end, and is adapted to enter any one of holes 26. Between disk 34 and a flange 35, inwardly projecting near the top of boss 31, there is mounted, on pin 32, a coil spring 36. Above flange 35 the upper end of boss 31 is formed on its inner side with two vertical slots 37, located diametrically opposite each other and adapted to accommodate a pin 38 which projects horizontally through pin 32. Slots 37 are of such depth that when pin 38 enters them, it will allow reduced end 33 to project into holes 26. Between slots 37 boss 31 is provided at its upper end with depressions 39, also located diametrically opposite to each other and likewise adapted to receive pin 38. Depressions 39 are made of such depth that when pin 38 rests in them, reduced end 33 can not engage holes 26. A plate 40 is attached to the upper end of pin 32 to serve as a handle for pulling pin 32 up against the tension of spring 36 and for turning pin 32, and is preferably provided with a point 41 to indicate the direction in which pin 38 is pointed.

It will be readily seen that by means of the device particularly illustrated in Figs. 3, 4 and 6, in connection with holes 26, my adjustable bearing-lock may readily be locked by permitting end 33 to enter one of holes 26, and may as readily be unlocked, so as to permit spring 27 to further tighten the bearing, by bringing the outer ends of pin 38 to rest in grooves 39.

Nuts 15 are preferably provided with grooves 42 adapted to be engaged by flanges 43 which are formed on bearing 13 by the cutting into such bearing of grooves 44 into which the lower ends of nuts 15 will fit with a snug sliding and rotating fit. Another feature of my present invention is that bolts 14 are driven with a tight driving fit into bearing 12. The purpose of these improvements is to make bolts 14 for operative purpose integral with bearing 12 and to connect nuts 15 in such a manner to bearing 13 that nuts 15 and bearing 13 are practically tied together as far as any vertical movement is concerned when my device is assembled. By these means I attain the important result that all movements of the parts constituting the bearing for shaft 10 with relation to each other are eliminated. I have found this feature of my invention to be of considerably importance.

I claim:

1. In a bearing lock, the combination of a bearing-portion; bolts firmly united to such portion; geared nuts on the bolts; another bearing portion so carried by the nuts as to advance and recede in unison with them; and a spring-driven gear engaging the nuts.

2. In a bearing-lock, the combination of a bearing-portion; bolts firmly united to such portion; geared nuts on the bolts; another bearing portion so carried by the nuts as to advance and recede in unison with them; a spring-driven gear engaging the nuts; a pin adapted to engage depressions in the spring-driven gear; and means for placing the pin into engagement, and holding it out of engagement, with the spring driven gear, at the will of the operator; substantially as and for the purpose described.

STEPHAN RATH.